United States Patent [19]
Hay et al.

[11] Patent Number: 5,550,736
[45] Date of Patent: Aug. 27, 1996

[54] FAIL-OPERATIONAL FAULT TOLERANT FLIGHT CRITICAL COMPUTER ARCHITECTURE AND MONITORING METHOD

[75] Inventors: Rick H. Hay, Cave Creek; Clarence S. Smith, Glendale; Robert D. Girts, Mesa; Larry J. Yount, Scottsdale, all of Ariz.

[73] Assignee: Honeywell Inc., Minneapolis, Minn.

[21] Appl. No.: 54,777

[22] Filed: Apr. 27, 1993

[51] Int. Cl.$^6$ .................................................. G06F 11/16
[52] U.S. Cl. .................. 364/424.03; 364/184; 244/76 R; 318/563; 371/68.1
[58] Field of Search .............. 364/424.01, 424.03, 364/184, 186, 187, 424.06; 318/563, 564, 565; 371/9.1, 11.1, 36, 67.1, 68.1, 68.3; 395/575; 244/76 R, 194

[56] References Cited

U.S. PATENT DOCUMENTS

| | | | |
|---|---|---|---|
| 4,096,989 | 6/1978 | Tawfik | 318/563 X |
| 4,130,241 | 12/1978 | Meredith et al. | 318/564 X |
| 4,327,437 | 4/1982 | Gelderloos | 371/68.3 |
| 4,345,191 | 8/1982 | Takats et al. | 318/564 |
| 4,472,780 | 9/1984 | Chenoweth et al. | 364/187 X |
| 4,622,667 | 11/1986 | Yount | 371/9.1 |
| 4,785,403 | 11/1988 | Kuhlberg | 364/424.06 |
| 4,787,041 | 11/1988 | Yount | 364/424.03 |
| 4,887,214 | 12/1989 | Takats et al. | 364/424.01 |
| 4,996,687 | 2/1991 | Hess et al. | 371/10.1 |
| 5,054,026 | 10/1991 | Tsubota | 371/68.3 |
| 5,088,021 | 2/1992 | McLaughlin et al. | 364/187 |
| 5,195,040 | 3/1993 | Goldsmith | 364/187 X |
| 5,202,980 | 4/1993 | Morita et al. | 395/575 |
| 5,274,554 | 12/1993 | Takats et al. | 364/424.03 |

*Primary Examiner*—Collin W. Park
*Attorney, Agent, or Firm*—Mark J. Gebhardt; Brian C. Downs; Ron E. Champion

[57] ABSTRACT

A flight critical computer system for an aircraft includes dual independent lanes having two processors in each lane. The first lane has a primary processor and a redundant processor and provides a first command signal. The second lane includes a primary processor and a redundant processor and provides a second command signal. A first monitor compares the primary processor of the first lane with the primary processor of the second lane and generates first comparison signals as a function of disagreement therebetween. A second monitor compares the output signals of the redundant processor of the second lane and the primary processor of the first lane and generates second comparison signals as a function of disagreement therebetween. A third monitor compares the primary processor of the second lane with the redundant processor of the first lane and generates third comparison signals as a function of disagreement therebetween. Selection logic selects as a function of the first, second and third comparison signals at least output generated by the processors as a command signal of the system while allowing for at least one processor to fail before both command signals from the lanes, respectively, are disabled.

15 Claims, 5 Drawing Sheets

FAIL-OPERATIONAL FAULT TOLERANT FLIGHT CRITICAL COMPUTER ARCHITECTURE AND MONITORING METHOD

FIELD OF THE INVENTION

The present invention relates to flight control systems utilizing digital flight control computers. In particular, the present invention pertains to a fail-operational fault tolerant flight critical computer architecture and monitoring therewith for random and generic processor faults to maximize the availability of the computer.

BACKGROUND OF THE INVENTION

Flight control systems are constrained by Federal Air Regulations to provide safe control of an aircraft throughout the regimes in which the flight control system is utilized. Any failure condition which prevents continued safe flight and landing must be extremely improbable. Present regulations require a very low probability of failure per hour for flight critical components. A flight critical portion of a flight control system is one of these critical components, the failure of which endangers the lives of the persons aboard the aircraft. Generally, the safety levels of components of the system is determined by aircraft level analysis, known to those skilled in the art. Analysis of non-critical flight control system elements, however, typically are performed to a much lesser probability level of failures per hour than flight critical portions. For example, components of a flight control system utilized in landing aircraft may be designated as flight critical, whereas, certain components utilized during cruise control may be designated as non-critical.

Flight control systems utilizing analog computers and components had been prevalent in the art wherein it had become completely practical to perform the verification and validation procedures to certify conformance of such systems to the safety requirements of the Federal Air Regulations. A known technique for enhancing the reliability and fault tolerance of flight critical components is that of dual redundancy. Dual redundancy is the utilization of two identical channels with cross channel monitoring to detect a failure in one of the channels. Although such systems are effective against random faults, cross channel monitoring does not provide effective detection of generic faults. A generic fault is defined as a fault that is inadvertently designed into a component such that all like components generically have this fault and respond in like but defective manners. When identical components having a generic fault are in respective redundant channels, the cross channel monitoring compares the same, although erroneous output from both channels, and therefore does not detect the error.

Such prior art dual redundant systems with identical channels provided fail passive performance with respect to random faults. When the cross-channel monitoring detected different outputs from the two channels, the dual channel flight control system was disengaged thereby failing in a passive manner. In order to effect fail operational performance with respect to random faults, two such dual redundant channel pairs were conventionally utilized, whereby a miscomparison in one pair would result in shut down of that pair with the other channel pair remaining in operation. The occurrence of a second random fault in a remaining channel pair would affect passive shutdown of the system. For the reasons discussed above, such multiple redundant systems were ineffective in detecting generic faults.

In present day technology, digital computers are supplanting the analog computers of the prior art technology. It has generally been found that a digital computer, including the hardware and software, is of such complexity that the verification and validation analysis for certification in accordance with Federal Air Regulations is exceedingly more time consuming, expensive and difficult than with the analog computer. The level of complexity and sophistication of the digital technology is increasing to the point where analysis and proof of certification to the stringent safety requirements is approaching impossibility. Such digital systems possess an almost unlimited number of unique failure modes and, therefor, indeterminable effects. A further problem is encountered in that software is susceptible to generic design errors. A generic design error can occur in the attendant assembler or compiler as well in the microcode for the processor. Software based redundant systems have the unique characteristic attribute of being precisely identical. Accordingly, a generic fault in, for example, detail program code or processor hardware may result in a unique set of otherwise benign time dependent events precipitating precisely the same hazardous response in all redundant systems at precisely the same time. Thus, the unique aspect of software systems to be precisely identical exasperate the problems with generic faults.

For the reasons given above, it is appreciated that redundant identical channels of digital data processing with cross channel monitoring may not detect hardware and software generic design errors so that reliability can be certified to the required level. Furthermore, with the increasingly complex and sophisticated digital processing being incorporated into flight control systems, it is approaching impossibility to prove by analysis the absence of such generic errors to the levels required by the Federal Air Regulations.

In order to overcome these problems, the automatic flight control technology has advanced to the concept of dissimilar redundancy. In dissimilar redundancy, dual dissimilar processors perform identical tasks utilizing dissimilar software with cross channel monitoring to detect failures. With this approach, a generic error designed into the processor or software of one channel will not exist in the processor or software of the other channel and the cross channel monitoring will detect the discrepancy. Such a prior art dual dissimilar processor system would be fail passive with respect to both random and generic faults. A random or generic fault occurring with respect to one of the dissimilar processors would be detected by the cross channel monitoring and the dual dissimilar processor system passively disengaged.

None of the prior art system configurations discussed above provide fail operational performance with respect to generic faults. Utilization of multiple dual redundant systems with similar processing elements fails to detect generic faults for the reasons discussed above. A mirror replication of dual channel subsystems utilizing dissimilar processing elements would result in a fail passive capability rather than a fail operational performance. This is because a generic fault detected in one dual subsystem causing that subsystem to be disengaged would be present in corresponding element in any other subsystem, also resulting in disengagement thereof. Thus, this dual dissimilar configuration instead of providing fail operational performance results in a fail passive system which is the property otherwise obtained from one half of the system.

U.S. Pat. No. 4,622,667 to Yount and entitled "Digital Fail Operational Automatic Flight Control System Utilizing Redundant Dissimilar Data Processing" describes an arrangement which provides fail operational performance for a first random or generic failure and fail passive performance for a second random or generic failure. An alternative embodiment in Yount provides fail operational performance for the first two random failures and fail passive performance for a third random failure and provides fail operational performance for the first generic failure and fail passive performance for the second generic failure.

The fail operational arrangement of Yount utilizes at least two independent flight control channels, each comprised of two lanes. Each lane is comprised of independent I/O. One lane in each channel includes a first digital data processor and the other lane includes a second data digital processor with an active third processor. The two lanes in each channel are cross monitored to detect disagreements between the outputs of the first and second processors and the outputs of the first and third processors. All the processors perform the same system tasks with respect to flight critical functions. The three processors in each channel provide dissimilar data processing with respect to each other. The two processors that do not have active third processors associated therewith in the respective subsystems provide dissimilar data processing with respect to each other.

The six processors of the two channels in Yount are arranged so that there are only three types of dissimilar data processing. When the cross monitoring in a channel detects a discrepancy between the outputs of the first and second processors, the output of the second processor is disabled and the active third processor continues servicing its channel. If the cross monitoring detects a discrepancy between the outputs of the first and second processors and the outputs of the first and third processors, the entire channel is disengaged. In effect, the third processor of the channel is substituted for the second processor when the second processor is detected to be defective, and if the substitution does not resolve the discrepancy, the channel is disengaged. In the alternative embodiment where the arrangement is fail operational for the first two random failures and fail passive for a third random failure and which is fail operational for the first generic failure and fail passive for the second generic failure, the arrangement utilizes three channels in a somewhat similar manner.

Figure 2:
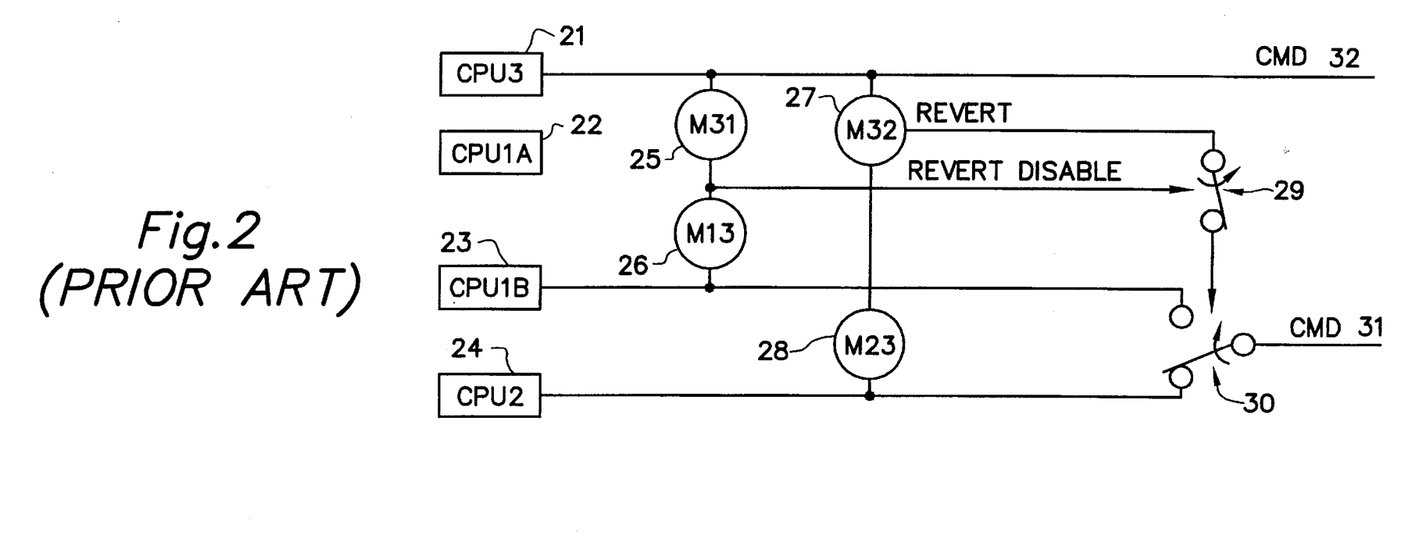
FIG. 2 is a schematic block diagram of one channel of a prior art flight critical computer architecture.

In another flight critical computer architecture, an internal monitoring mechanism of the MD-11 Flight Control Computer having a dual lane computer channel with two processors per lane is apparent, FIG. 2. The MD-11 Flight Control Computer is a dual lane computer 20 with two processors 21, 22 in lane 1 and two processors 23, 24 in a second lane. With the MD-11 Flight Control Computer, one of the processors 22 in one lane, is locked out so that it is unable to output flight critical commands. No comparison monitoring is performed with the locked out processor 22, so the MD-11 configuration is redundant in only one lane, i.e. the second lane. Therefore, each MD-11 flight critical computer incorporates a fail passive design since a single processor fault in the non-redundant lane can shut down the flight control computer. As shown in FIG. 2, processor 21 is the lone processor in the first lane. Processor 21 sets a revert for switch 30 if processor 21 detects a failure of processor 24 by way of monitoring device 27, so that the output of processor 23 is the command output 31. Processor 21 sets a revert disable for switch 29 if processor 21 detects, by way of monitoring function 25, that processor 23 has failed. If monitoring function 26 or 28 detects a failure of processor 21, command output 32 is disabled, as the locked out processor 22 is available only for non-critical tasks.

As described above, it can be seen that in order to obtain fail operational performance for a first random or generic failure, two channels are necessary with cross monitoring within such channels as shown in U.S. Pat. No. 4,622,667. Likewise, a single MD-11 flight critical computer does not provide redundancy in two lanes and therefore is only a fail passive design since a single processor fault in the channel can shut down the flight critical computer. As such, the need for a fail operational fault tolerant flight critical computer architecture for random and generic processor faults having an implementation within one channel exists.

SUMMARY OF THE INVENTION

The present invention provides a fail operational fault tolerant flight critical computer architecture for random and generic processor faults with redundancy in dual independent lanes thereof. With redundancy in both lanes, there will always be a processor to revert to for a first fault. Both lanes are protected against generic and random processor faults. Therefore, with redundancy in both lanes, the availability of the flight critical computer is increased since it takes a minimum of two processor faults to shut the flight critical computer down. No single processor fault will cause the shutdown of the flight critical computer.

The flight critical computer system for the aircraft, wherein the aircraft has sensor means for providing sensor signals representative of characteristics concerning the aircraft, includes a first and second lane. The first lane has a first primary processor and a first redundant processor and provides a first command signal. The first primary processor generates a first output signal and the first redundant processor generates a first redundant output signal as a function of the sensor signals. The second lane has a second primary processor and a second redundant processor and provides a second command signal. The second primary processor generates a second output signal and a second redundant processor generates a second redundant output signal as a function of the sensor signals.

The flight critical computer system also includes first, second and third monitors. The first monitor compares the first output signal with the second output signal and generates first comparison signals as a function of disagreement therebetween. A second monitor compares the first output signal with the second redundant output signal and generates second comparison signals as a function of disagreement therebetween. The third monitor compares the second output signal with the first redundant output signal and generates third comparison signals as a function of disagreement therebetween. A selector selects as a function of the first, second and third comparison signals, at least one of the signals generated by the processors as at least one of the command signals while allowing for at least one processor to fail before both the first and second command signals from the first and second lanes, respectively, are disabled.

In a further embodiment of the invention, the selector includes first selector logic responsive to the first comparison signals and the second comparison signals for selecting either the first output signal or the first redundant output signal as the command signal of the first lane. The selector also includes a second selector logic responsive to the first comparison signals and the third comparison signals for selecting either the second output signal or the second redundant output signal as the command signal of the second lane. First reversion logic responsive to the first comparison signals and the third comparison signals prohibits selection of the first redundant output signal as the command signal of the first lane and second reversion logic responsive to the first comparison signal and the second comparison signals prohibits selection of the second redundant output signal as the command signal of the second lane. A disabling means responsive to the first, second and third comparison signals disables the command outputs from both the first and second lanes when both primary processors, or one of the primary processors and the redundant processor of the same lane fail.

In yet another embodiment of the present invention, the first and second primary processors are each dissimilar in hardware and/or software with respect to each other and the first and second redundant processors are dissimilar in hardware and/or software with respect to the first and second primary processors.

A monitoring method for a fail-operational fault tolerant flight critical computer architecture is also described. The method includes providing dual independent lanes having two processors in each lane. The first lane includes a first primary processor and a first redundant processor and the second lane includes a second primary processor and a second redundant processor. Each of the processors provides an output signal in response to signals from one or more sensors representative of characteristics concerning an aircraft. The outputs of the first and second primary processors are monitored with respect to each other and first comparison signals representative thereof are generated. The outputs of the first redundant processor and the second primary processor are monitored with respect to each other and second comparison signals representative thereof are generated. The outputs of the second redundant processor and the first primary processor are monitored with respect to each other and third comparison signals representative thereof are generated. At least one of the output signals of the processors is selected as at least one command signal for the aircraft as a function of the first, second and third comparison signals.

In one embodiment of the monitoring method, the first and second primary processors are each dissimilar in hardware and/or software with respect to each other and the first and second redundant processors are dissimilar in hardware and/or software with respect to the first and second primary processors.

DESCRIPTION OF THE PREFERRED EMBODIMENT

Figure 1:
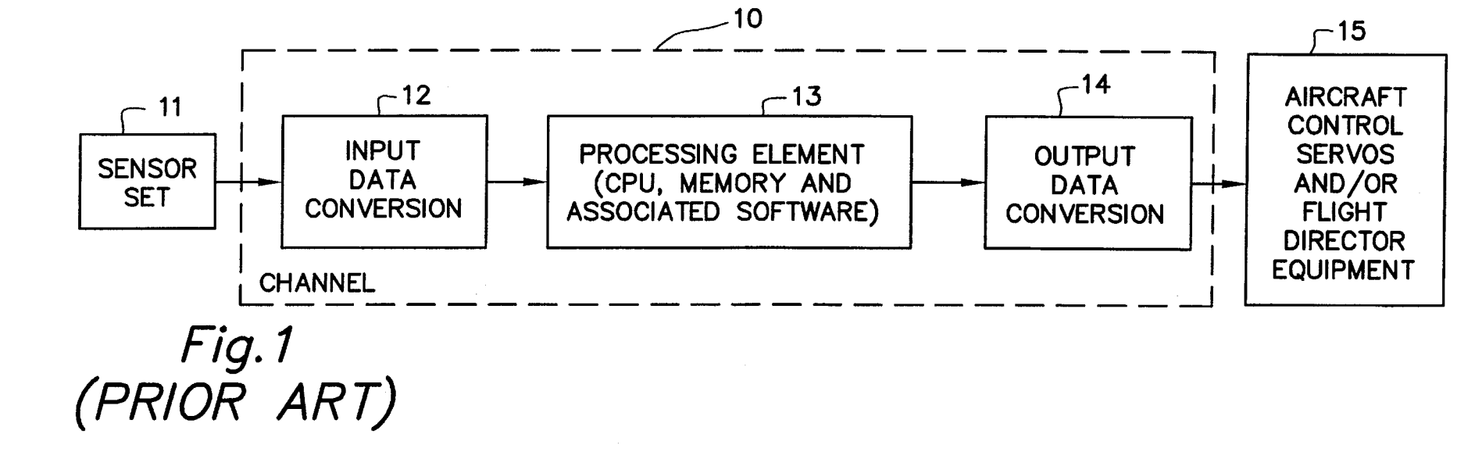
FIG. 1 is a block diagram of a prior art channel of a flight critical computer system.

Referring to FIG. 1, the elements comprising a data processing channel 10 of a flight control system are illustrated. The channel 10 receives sensor signals from a sensor set 11 which may include conventional attitude, rate and acceleration sensors as well as other devices such as control wheel force sensors that are conventionally utilized in modern transport. The sensor set 11 may also include such devices as directional and vertical gyroscopes, rate gyroscopes, and accelerometers. Preferably, sensor set 11 will include one or more inertial reference units for providing attitude information. The sensor set 11 may additionally include conventional radial guidance equipment, such as VOR, DME and ILS receivers, and the like as well as radial altimeters. The sensor set 11 may also include an air data computer for providing such parameters as barometric altitude, total air temperature, air speed and the like. A flight management system may also be included in the sensor set 11 as well as aircraft control surface position and rate transducers, such as linear variable differential transformers, synchros and tachometers as well as engine sensors. The sensor set 11 includes the required compliment of analog and digital sensors necessary to provide signals for use in controlling the aircraft. It will be appreciated that included within the sensor set 11 are conventional, analog and digital signal processing circuits for preparing the sensor signals for entry into the channel 10. Such processing circuits may include demodulators and the like.

The channel 10 includes an input data conversion portion 12 for receiving all of the signals from the sensor set 11 and converting these signals into a format suitable for application to processing element 13. The input data conversion portion 12 includes one or more conventional analog to digital converters for converting the analog signals from the sensor set 11 into digital format. The sensor signals from the sensor set 11 may have a variety of formats such as discrete voltage levels, variable voltage levels, amplitude modulated AC carriers, serial digital information in various formats and various data rates and fiber optics information. The input data conversion may, for example, include serial to parallel conversion, or demodulation of a sensor signal. Analog sensor signals may be serial or parallel digital data from, for example, an air data computer requiring serial-to-parallel conversion and/or level shifting.

The digital processing element 13 of channel 10 is responsive to the input signals from the input data conversion block 12. The processing element 13 includes a central processing unit (CPU) or processor, memory and software for performing operations upon the information provided by the sensor set 11 to produce responses to the aircraft for performing such functions as aircraft control.

Channel 10 also includes an output data conversion portion 14 responsive to the outputs from the digital processing element 13 for converting the processor outputs into signals suitable for providing a variety of control and display functions required in the flight control system. Basically, the output data conversion portion 14 will include one or more digital-to-analog converters and additional equipment for formatting the signals. The output of the output data conversion portion 14 may be discrete voltage levels, single digits, light transmission for fiber optics, serial digital transmissions, voltages for servo valves to control hydraulic actuators for the aerodynamic control surfaces of the aircraft, and the like.

The outputs for the channel 10 are applied to aircraft control servos and/or flight director equipment 15 for providing conventional control of the aircraft. The control servos and actuators may be of a well known electro-mechanical or electro-hydraulic variety and are schematically representative of the total aircraft surface actuator system which may in modern jet transport be of the redundant variety. Channel 10 may also provide signals to conventional flight director instrumentation which provides visual commands to the pilot via attitude directed instruments in a well known manner.

Figure 3:
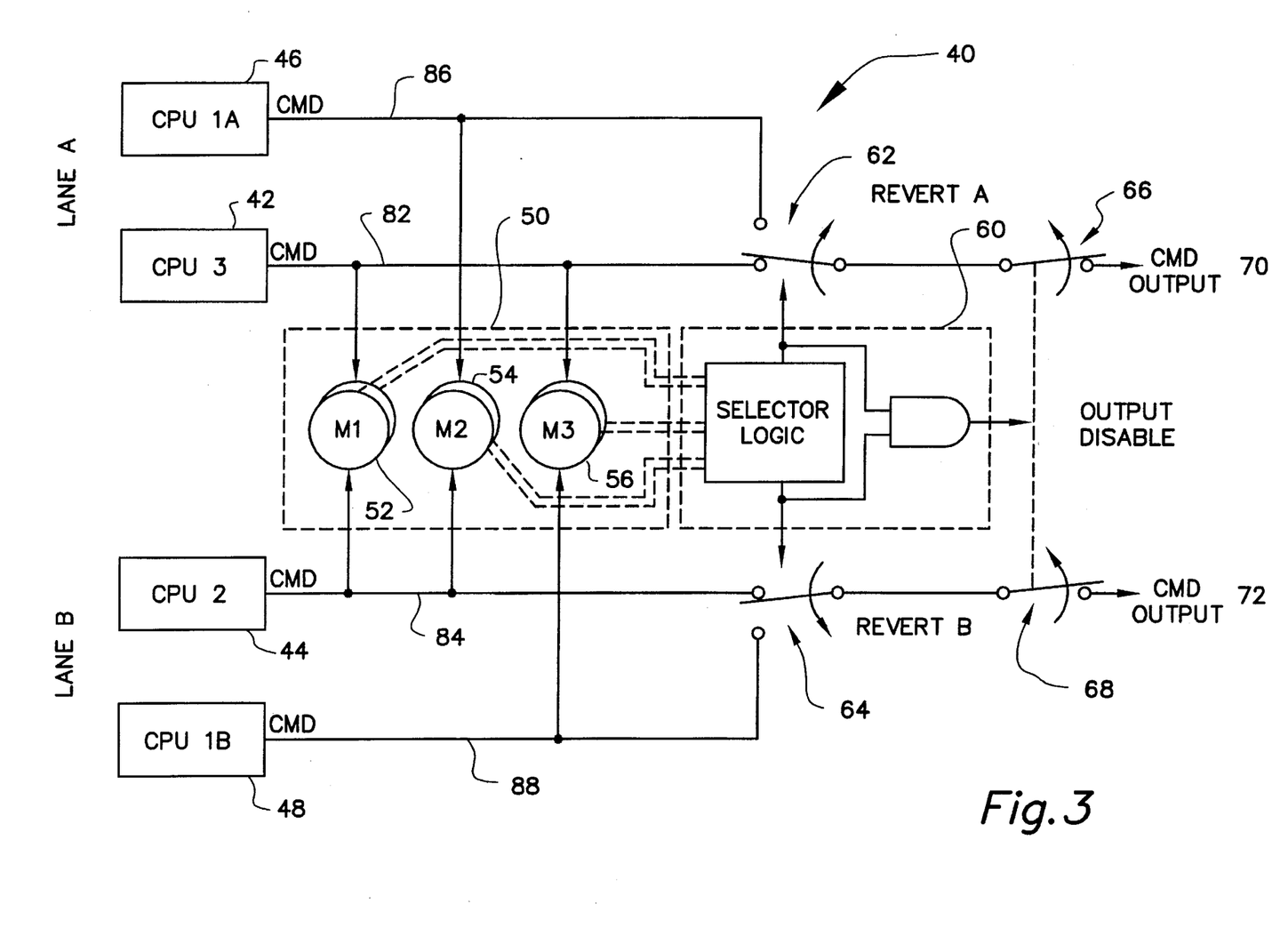
FIG. 3 is a general block diagram of the flight critical computer architecture of the present invention.
Figure 4A:
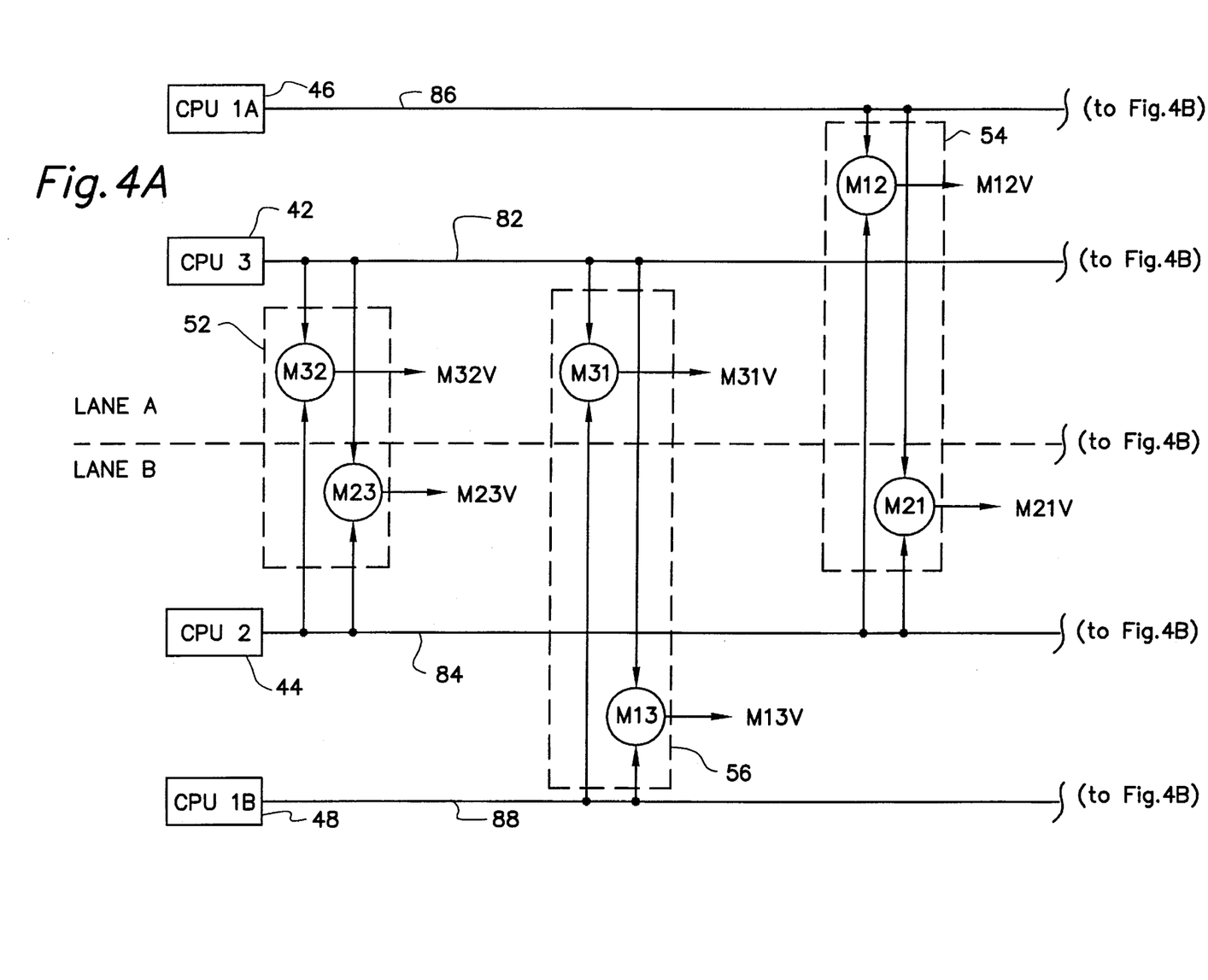
FIG. 4 is a more detailed schematic block diagram of the flight critical computer architecture of FIG. 3.
Figure 4B:
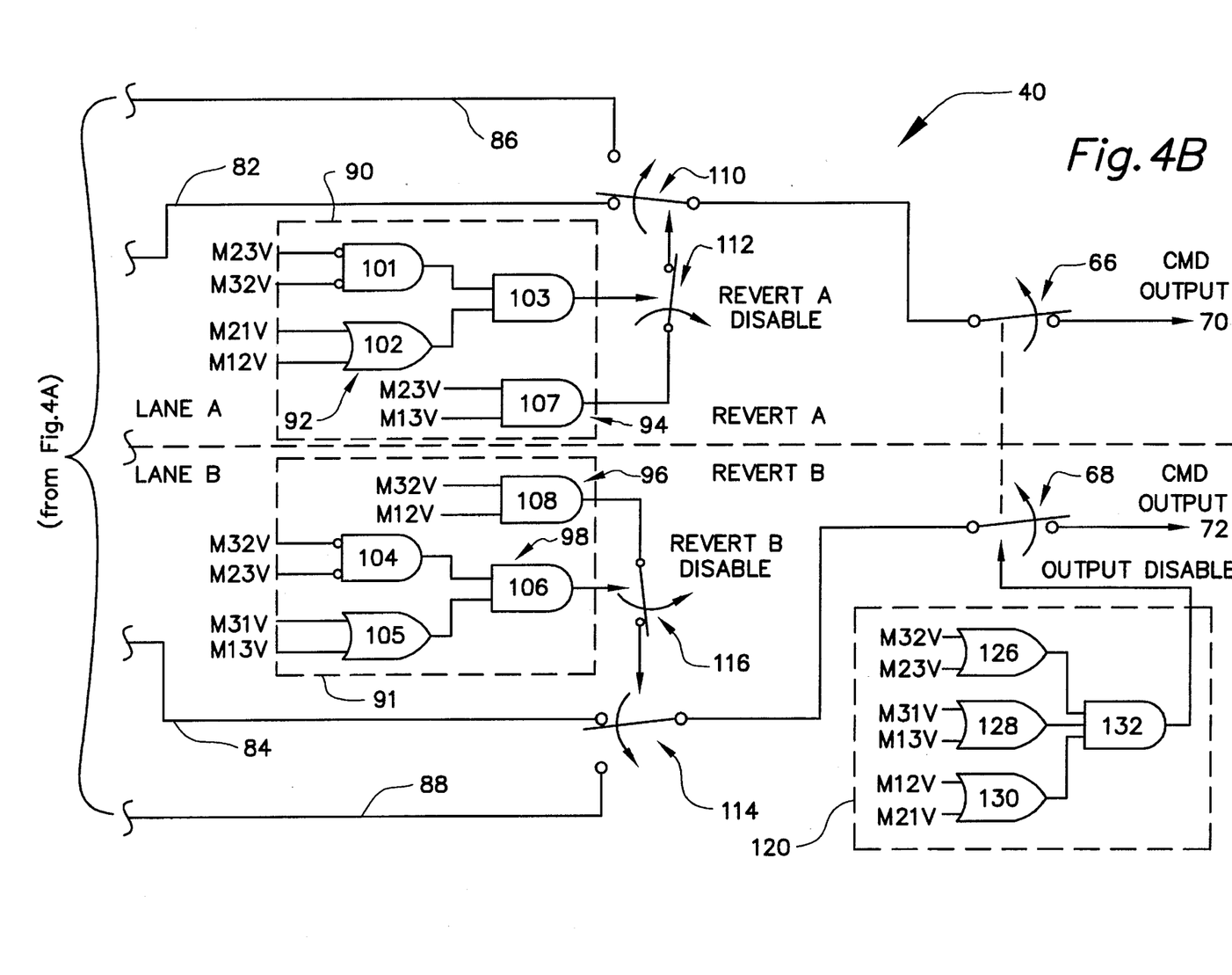
Figure 5:
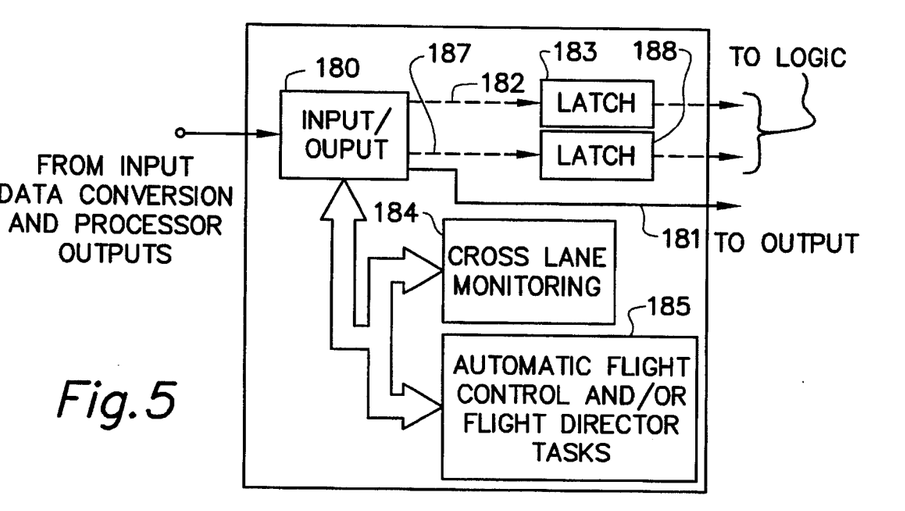
FIG. 5 is a general block diagram of one of the processors of the flight critical computer architecture of FIG. 4.

In the flight control system configured in accordance with the present invention, the processing element 13 is configured in a manner to be described below with reference to FIGS. 3–5 to provide a fail-operational fault tolerant flight critical computer architecture for random and generic processor faults which has command outputs of extremely high confidence levels as required by the Federal Air Regulations. Referring to FIGS. 3–5, the fail-operational fault tolerant flight critical computer system 40 is implemented with a monitoring scheme using an architecture of four processors as the processing element 13 of one channel 10, FIG. 1. The flight control system 40 utilizes dual independent lanes, Lane A and Lane B, with two processors in each lane. Lane A includes a primary processor 42 and a redundant processor 46. Primary processor 42 generates a primary output signal 82 in response to sensor signals from sensor set 11 and redundant processor 46 generates redundant output signal 86 in response to the sensor signals. Lane B includes primary processor 44 and redundant processor 46. Primary processor 44 generates output signal 84 in response to the sensor set signals from sensor set 11 and redundant processor 48 generates redundant output signal 88 in response to such sensor signals.

The Lanes A and B are cross coupled in a cross lane monitoring arrangement 50. Monitoring arrangement 50 includes a first monitor 52 for monitoring the outputs of primary processors 42 and 44 with respect to each other. A second monitor 54 of the monitoring arrangement 50 provides monitoring of the outputs generated by primary processor 44 and redundant processor 46 with respect to each other. The monitoring arrangement 50 further includes a third monitor 56 for monitoring the outputs of primary processor 42 and redundant processor 48 with respect to each other. Each processor 42, 44, 46, and 48 includes software as will be discussed further below for comparing outputs of the processors in Lane A and B with respect to each other. Each monitor of the monitoring arrangement 50 provides output signals representative of agreement or disagreement between the processors monitored for input to selector and control logic 60.

Selector and control logic 60 control switches 62, 64, 66 and 68 to provide command outputs 70 and 72 to achieve a fail operational performance to the levels required by the Federal Air Regulations. To achieve these levels, three dissimilar types of processors, each different processor type being programmed in a different language, are utilized with respect to processors 42, 44, 46 and 48. The redundant processors 46 and 48 are first processor type. Primary processor 42 and primary processor 44 are of a second and third processor type; different than the redundant processors 46, 48. The redundant processors 46 and 48 are each programmed in a first program language. Primary processor 42 is programmed in a second program language and primary processor 44 is programmed in a third program language. Thus, it is appreciated that the program language of any of the processors in the system is selected from a group consisting of three dissimilar program types and that the four processors are selected from a group consisting of three dissimilar processor types.

Dissimilar processor types may be effected by utilizing three processors of different electrical and logic design which additionally may be manufactured by different manufacturers. Software may be rendered dissimilar by utilizing three distinct teams of program designers providing three distinct program specifications and three separate teams of programmers writing dissimilar code in dissimilar languages. The assemblers and compilers utilized for each type of data processing may also be dissimilar with respect to each other as may the software operating system and for each type of data processing. Software support procedures, such as software testing may also be rendered dissimilar by utilizing dissimilar procedures and personnel. The task, however, that each processing element performs are similar with respect to each other.

In a preferred embodiment of the invention, three dissimilar processor types are utilized. They include a 68020 processor manufactured by Motorola, a 386 processor available from Intel and an SDP185 processor designed by the assignee of the present invention for airborne applications. Three dissimilar programs which are utilized in conjunction with the processors are PLM, C, and PASCAL programming. It is appreciated that although three specific processor types and three specific program languages are delineated above, anythree types of processors and any three types of program languages that provide dissimilar data processing with respect to each other may be utilized and practiced in the invention.

With reference to FIGS. 4 and 5, further details of the flight control computer system 40 shall be described. The first monitor 52, second monitor 54, and third monitor 56, each include, as shown in FIG. 4, a pair of monitors. First monitor 52 includes monitor M32 and monitor M23. Monitor M32 is an internal software monitor in primary processor 42 which compares the output signals 82 of primary processor 42 with the output signals 84 of primary processor 44. Likewise, monitor M23 is an internal software monitor in primary processor 44 which compares the output signals of primary processor 44 with the output signals 82 of primary processor 42. When the output signals 84 of primary processor 44 agree with the output signals 82 of primary processor 42, the monitor M32 generates a comparison signal M32V which is kept low to represent such agreement. When there is a disagreement between these output signals 82, 84, monitor M32 generates a comparison signal M32V which is set high, representative of such disagreement. Likewise, if there is agreement in monitor M23, then monitor M23 generates a comparison signal M23V which is kept low. If there is disagreement in monitor M23, then monitor M23 generates a comparison signal M23V which is set high.

In a similar fashion, monitor 54 includes a pair of monitors, monitor M12 and monitor M21. Monitor M12 and M21 generates comparison signals M12V representative of agreement or disagreement between primary processor 44 and redundant processor 46. In addition, monitor 56 includes a pair of monitors M31 and M13. Monitor M31, internal to processor 42, generates comparison signals M31V representative of agreement or disagreement between primary processor 42 and redundant processor 48. Monitor M13, internal to processor 48, generates comparison signals M13V representative of disagreement between primary processor 42 and redundant processor 48.

Implementation of the primary processors 42 and 44 and the redundant processors 46 and 48 is shown in FIG. 5. An input/output section 180 of the processor receives input from the associated input data conversion block 12, FIG. 2, and the other processor outputs of which the processor is monitoring. The input/output block 180 provides data outputs on line 181 to the switched command output as discussed further below and to the other processors which are monitoring its output. The input/output block 180 also provides discrete signals on lines 182 and 187 via latch 183 and 188 to the selector and control logic 60 for determining which processor output shall be presented at command output 70 and command output 72. The discrete signals on lines 182, 187 are provided as a result of the cross lane monitoring in a manner to be explained further below. Each processor 42, 44, 46 and 48 includes a cross lane monitoring capability illustrated by block 184. The cross lane monitoring 184 compares the outputs from the processors being monitored with its own output and sets into the latches 183, 188 discrete signals representative of agreement or disagreement between the processors being monitored in the two lanes.

The implementation of the processors, includes the capability of performing numerous flight control or other directed tasks required for the flight control system as illustrated by block 185. This task performance capability generates the output signals in response to the sensor signals for each processor. In other words, each processor 42, 44, 46 and 48 includes software for cross lane monitoring 184 and flight control or directed tasks 185. Each processor then, upon input of converted sensor signals, generates output signals which are applied on solid line 181 to the switched command output and the other processors monitoring the output. In addition, each processor includes software for cross lane monitoring 184 which upon input of output signals from the processors it is monitoring, and after comparison to its own output signals, generates a discrete signal for application to selector and control logic 60 via dashed lines 182, 187.

For example, if the implementation is of primary processor 42, then the input/output block 180 receives converted sensor signals from the input data conversion block 12, the output signals 84 of primary processor 44 and the output signals 88 of redundant processor 48. The flight control and/or directed task software 185 generates output signals as a function of the sensor signals applied. The output signals generated are compared to the output signals 84 generated by primary processor 44 and the output signals 88 generated by redundant processor 48. Comparison signals M32V and M31V are then generated representative of disagreement or agreement between such outputs. Such comparison signals are output on line 182 and line 187 via latches 183 and 188. In addition, the output signal 82 of primary processor 42 is output on line 181. Likewise, the other processors 44, 46 and 48 are implemented in substantially the same manner depending on the amount of monitoring to be performed. For example, redundant processor 46 would generate one comparison signal Monitor M12, as only one processor is monitored thereby.

The cross lane monitoring software 184 is of the time magnitude monitoring type. Therefore, when a predetermined magnitude of an error is detected for a predetermined time frame, the monitor which is performing the comparison is tripped and the comparison signal for that monitor is set high when such conditions are met. For example, when an error is of great magnitude for a short time the monitor may be tripped or when the error is of small magnitude for a long time, the monitor may be tripped. Time-magnitude type monitors are known in the art. It is appreciated that other types of cross lane monitors may be utilized in practicing the invention and that other such monitors fall within the scope of the present invention. For example, dedicated digital comparison logic could be utilized to the same effect. Analog circuitry could also be used as cross lane comparators. The monitor could be hardware implemented as well as software implemented.

Shown in FIGS. 3 and 4, six comparison signals M32V, M23V, M31V, M13V, M12V, and M21V are applied to selector and control logic 60 for controlling which processor output is to be output as command output 70 and/or command output 72. The selector and control logic 60 includes. Lane A selector logic 90, Lane B selector logic 91 and output disable logic 120. Lane A selector logic 90 includes revert A logic 94 and revert disable logic 92. Revert A logic 94 includes and gate 107 which receives comparison signals M23V and M13V from the appropriate monitors. If both the comparison signals M23V and M13V are set high, indicating that there is disagreement between output signal 84 and output signal 82 and output signal 88 and output signal 82, primary processor 42 is determined to be faulty and command output 70 is switched from providing the output signal of primary processor 42 to the output signal 86 of redundant processor 46 via switch 110.

If, however, redundant processor 46 is determined to be faulty before the fault of primary processor 42, then the reversion of command output 70 from the primary processor 42 to the redundant processor 46 via switch 110 is inhibited by switch 112. Whether or not redundant processor 46 is faulty is determined by revert A disable logic 92. Revert A disable logic 92 includes a first and gate 101 which receives the inverted comparison signals M23V and M32V. The comparison signals M21V and M12V are applied to or gate 102. The outputs of the and gate 101 and or gate 102 are applied to the second and gate 103. When the output of and gate 103 is high, the switch 112 inhibits reversion of command output 70 from primary processor 42 to the output 86 of redundant processor 46.

Reversion of command output 72 from output 84 of primary processor 42 to output signal 88 of redundant processor 48 via a switch 114 and the inhibition of such reversion via switch 116 is controlled in the same manner by revert B logic 96 and revert B disable logic 94 as described above with reference to lane A. Revert B logic 96 includes and gate 108 for receiving comparison signals M32V and M12V. Revert B disable logic 91 includes a first and gate 104 for receiving the inverted comparison signals M32V and M23V, or gate 105 for receiving comparison signals M31V and M13V, and and gate 106 for receiving the outputs of first and gate 104 and or gate 105.

Output disable logic 120 of selector and control logic 60 disables both command outputs 70 and 72 via switches 66 and 68 if processor 42 and primary processor 44 both fail, if primary processor 42 and redundant processor 46, both in lane A, fail, or if primary processor 44 and redundant processor 48, both in lane B, fail. The output disable logic 120 includes a first or gate 126 for receiving comparison signals M32V and M23V, a second or gate 128 for receiving comparison signals M31V and M13V, and a third or gate 130 for receiving comparison signals M12V and M21V. The output disable logic 120 further includes and gate 132 for receiving the outputs from or gates 126, 128 and 130 and for controlling switches 66 and 68 to disable command output 70 and command output 72 of both lanes when the output thereof is high.

The selector and control logic 60 utilizes the comparison signals generated by the monitors to control the command outputs of the dual independent lanes of flight computer system 40. With this architecture and monitoring configuration, the flight control computer can tolerate at least one processor failure before the outputs are disabled. With redundancy in both lanes, there is always a processor to revert to for a first fault. For example, if monitor M32 and monitor M12 indicate the failure of primary processor 44, then command output 72 is reverted to redundant processor 48. Likewise, if monitors M23 and M13 indicate failure of primary processor 42, then command output 70 is reverted to redundant output signal 86 of redundant processor 46. With both lanes protected against generic and random processor faults, utilizing dissimilar software and hardware and the redundancy in both lanes, the availability of the flight control computer increases since it takes a minimum of two processor faults to shut down the flight critical computer down. Because of the stringent levels required by the Federal Air Regulations in flight critical digital processing with absence of faults with respect to hardware and software, this is particularly important. Such flight critical functions are performed to a high confidence level.

Figure 6:
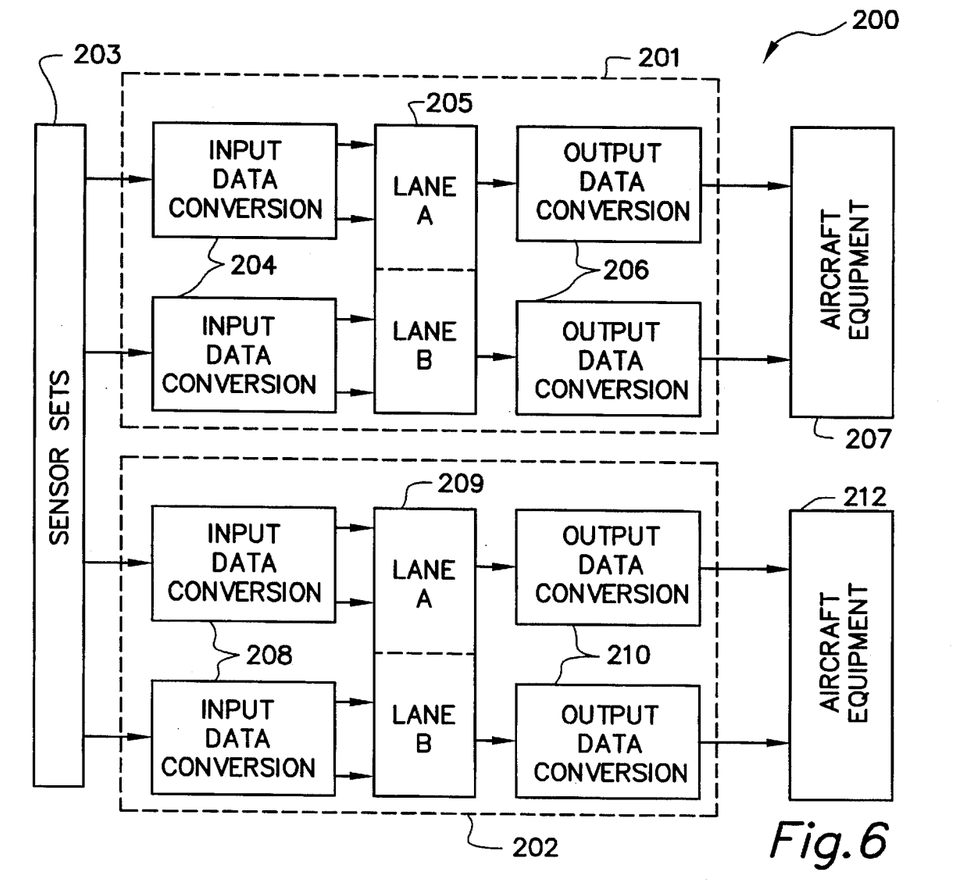
FIG. 6 is a block diagram of a flight critical computer architecture utilizing two channels implemented in accordance with the present invention.

Referring to FIG. 6, a flight control system 200 is illustrated with two channels 201 and 202 implemented in the same manner as channel 40 explained above. The channels 200, 202 each have a pair of input data conversion blocks 204 for providing the processors in Lane A and Lane B 205 with sensor signals from sensor sets 203. The command outputs from Lane A and Lane B are applied to the output data conversion blocks 206 for application to the appropriate aircraft equipment 207. Likewise, Lanes A and B 209 of channel 202 receive converted sensor signals from sensor sets 203 via input data conversion blocks 208. The output signals of Lanes A and B 209 are applied to aircraft equipment 212 after being converted to appropriate control signals via output data conversion blocks 210. It should be readily apparent that any number of channels can be provided in a flight control computer system to provide critical data for aircraft operation.

The above described embodiments of the invention are explained in terms of various elements of logic for reversion and disabling outputs in response to detected failures. The specific elements of logic are illustrated by way of example with other disabling and/or reversion arrangements being usable in practicing the invention. For example, the switches, the selector logic, and other elements may perform their function by substitution of equivalence therefor. In addition, the present invention was explained in terms of a flight control system, however, the inventive concept is applicable to other environments wherein critical functions are performed.

Those skilled in the art will recognize that only preferred embodiments of the present invention have been disclosed herein, and other advantages may be found and realized, and various modifications may be suggested by those versed in the art, and it should be understood that the embodiment shown herein may be altered and modified without departing from the true spirit and scope of the invention as defined in the accompanying claims.

What is claimed is:

1. A flight critical computer system for an aircraft, the aircraft having sensor means for providing sensor signals representative of characteristics concerning the aircraft, said system comprising:

a first lane having a first primary processor and a first redundant processor and for providing a first command signal, said first primary processor for providing a first output signal and said first redundant processor for generating a first redundant output signal, as a function of said sensor signals;

a second lane having a second primary processor and a second redundant processor and for providing a second command signal, said second primary processor for providing a second output signal and said second redundant processor for generating a second redundant output signal, as a function of said sensor signals;

wherein said first primary processor is dissimilar from said second primary processor and said first and second redundant processors, said second primary processor is dissimilar from said first and second redundant processors, and said redundant processors are substantially similar to each other;

first monitoring means for comparing said first output signal with said second output signal and generating first comparison signals as a function of disagreement therebetween;

second monitoring means for comparing said first output signal with said second redundant output signal and generating second comparison signals as a function of disagreement therebetween;

third monitoring means for comparing said second output signal with said first redundant output signal and generating third comparison signals as a function of disagreement therebetween; and selection means for selecting, as a function of said first, second, and third comparison signals, one of said first output signal and said first redundant output signal as said first command signal and one of said second output signal and said second redundant output signal as said second command signal while allowing for at least one of said processors to fail before disabling either of said lanes and disabling both of said lanes when both of said lanes are unable to detect any processor failure.

2. A system according to claim 1, wherein said selection means includes:

first selector means responsive to said first comparison signals and said second comparison signals for selecting one of said first output signal and said first redundant output signal as said first command signal;

first reversion means responsive to said first comparison signals and said third comparison signals for prohibiting selection of said first redundant output signal as said first command signal;

second selector means responsive to said first comparison signals and said third comparison signals for selecting one of said second output signal and said second redundant output signal as said second command signal;

second reversion means responsive to said first comparison signals and said second comparison signals for prohibiting selection of said second redundant output signal as said second command signal;

disable means responsive to said first comparison signals, said second comparison signals and said third comparison signals for disabling the command outputs from both said first and second lane when both primary processors, or one of said primary processors and said redundant processor of the same lane fail.

3. A system according to claim 2, wherein said first selector means includes:

means for normally selecting said first output signal as said first command signal of said first lane if said first and second comparison signals represent agreement between said second output signal of said second primary processor, said second redundant output signal of said second redundant processor, and said first output signal of said first primary processor; and means for selecting said first redundant output signal of said first redundant processor as said first command signal of said first lane if said first and second comparison signals represent disagreement between said second output signal of said second primary processor, said second redundant output signal of said second redundant processor, and said first output signal of said first primary processor.

4. A system according to claim 3, wherein said selection means further includes means for disabling selection of said first redundant output signal of said first redundant processor as said first command signal if said first and third comparison signals represent disagreement between said first output signal of said first primary processor, said first redundant output signal of said first redundant processor, and said second output signal of said second primary processor.

5. A system according to claim 2, wherein said second selector means includes:

means for normally selecting said second output signal of said second primary processor as said second command signal of said second lane if said first and third comparison signals represent agreement between said first output signal of said first primary processor, said first redundant output signal of said first redundant processor, and said second output signal of said second primary processor; and means for selecting said second redundant output signal of said second redundant processor as said second command signal of said second lane if said first and third comparison signals represent disagreement between said first output signal of said first primary processors, said first redundant output signal of said first redundant processor, and said second output signal of said second primary processor.

6. A system according to claim 5, wherein said selection means further includes means for disabling selection of said second redundant output signal of said second redundant processor for said command signal of said second lane if said first and second comparison signals represent disagreement between said second output signal of said second primary processors, said second redundant output signal of said second redundant processors, and said first output signal of said first primary processor.

7. A system according to claim 1, wherein said first and second primary processors are each dissimilar in hardware and software with respect to each other and wherein said first and second redundant processors are dissimilar in hardware and software with respect to said first and second primary processors.

8. A system according to claim 1, wherein said first and second primary processors are dissimilar in hardware with respect to each other, and wherein said first and second redundant processors are dissimilar in hardware with respect to said first and second primary processors.

9. A system according to claim 1, wherein said first and second primary processors are dissimilar in software with respect to each other, and wherein said first and second redundant processors are dissimilar in software with respect to said first and second primary processors.

10. A system according to claim 1, wherein said selection means includes means for disabling both said first command output and said second command output from both said first and second lanes if both said first and second primary processors fail or if both a primary processor and a redundant processor of one of said first or second lanes fail.

11. A flight critical computer system for an aircraft, the aircraft having sensor means for providing sensor signals representative of characteristics concerning the aircraft, said system comprising:

a first lane having a first primary processor and a first redundant processor and for providing a first command signal, said first primary processor for generating a first output signal and said first redundant processor for providing a first redundant output signal as a function of said sensor signals;

a second lane having a second primary processor and a second redundant processor and for providing a second command signal, said second primary processor for generating a second output signal and said second redundant processor for generating a second redundant output signal as a function of said sensor signals;

wherein said first primary processor is dissimilar from said second primary processor and said first and second redundant processors, said second primary processor is dissimilar from said first and second redundant processors, and said first and second redundant processors are substantially similar to each other;

wherein said first primary processor includes first monitor means for monitoring said second primary processor and second monitor means for monitoring said second redundant processor, said first and second monitor means for generating first and second comparison signals, respectively, representative of disagreement or agreement therebetween;

wherein said second primary processor includes third monitor means for monitoring said first primary processor and fourth monitor means for monitoring said first redundant processor, said third and fourth monitor means for generating third and fourth comparison signals, respectively, representative of disagreement or agreement therebetween;

wherein said first redundant processor includes fifth monitor means for monitoring said second primary processor and for generating fifth comparison signals representative of disagreement or agreement therebetween;

wherein said second redundant processor includes sixth monitor means for monitoring said first primary processor and for generating sixth comparison signals representative of disagreement or agreement therebetween, and;

selection means for selecting, as a function of said first, second, third, fourth, fifth, and sixth comparison signals, one of said first output signal and said first redundant output signal as said first command signal and one of said second output signal and said second redundant output signal as said second command signal while allowing for at least one of said primary processors and said redundant processors to fail before both said first and second command signals from said first and second lanes, respectively, are disabled.

12. A system according to claim 11, wherein said selection means includes;

first selector means responsive to said third comparison signals and said sixth comparison signals for selecting one of said first output signal and said first redundant output signal as said first command signal;

first reversion means responsive to said first comparison signals, third comparison signals, fourth comparison signals and fifth comparison signals for prohibiting selection of said first redundant output signal as said first command signal;

second selector means responsive to said first comparison signals and said fifth comparison signals for selecting one of said second output signal and said second redundant output signal as said second command signal;

second reversion means responsive to said first comparison signals, second comparison signals, third comparison signals and sixth comparison signals for prohibiting selection of said second redundant output signal as said second command signal; and disable means responsive to said first, second, third, fourth, fifth and sixth comparison signals for disabling said first and second command outputs from both said first and second lanes when both primary processors, or one of said primary processors and said redundant processor of the same lane fail.

13. A monitoring method for fail-operational fault tolerant flight critical computer architecture, said method comprising the steps of:

providing dual independent lanes having two dissimilar processors in each lane, said first lane including a first primary processor and a first redundant processor and said second lane including a second primary processor and a second redundant processor, said first and second primary processors being dissimilar and said redundant processors being similar to each other, each of said processors producing an output signal in response to signals from one or more sensors representative of characteristics concerning an aircraft;

monitoring the outputs of said first and second primary processors with respect to each other and generating comparison signals representative thereof;

monitoring the outputs of said first redundant processor and said second primary processor with respect to each other and generating second comparison signals representative thereof;

monitoring the outputs of said second redundant processor and said first primary processor with respect to each other and generating third comparison signals representative thereof; and selecting one of said output signals of said first primary processor and said first redundant processor and selecting one of said output signals of said second primary processor and said second redundant processor as command signals for said aircraft as a function of said first, second, and third comparison signals.

14. A method according to claim 13, wherein said selecting step includes the step of allowing for at least one of said processors to fail before said command signals are disabled.

15. A method according to claim 13, wherein said selecting step includes the steps of:

selecting the output signal of said first primary processor as a command output of said first lane if said first and third comparison signals represent that said second primary processor and second redundant processor agree with said first primary processor;

selecting the output signal of said first redundant processor for the command output of said first lane if said first and third comparison signals represent that said second primary processor and said second redundant processor disagree with said first primary processor, but only if said first redundant processor has not also failed;

selecting the output signal of said second primary processor as a command output of said second lane if said first and second comparison signals represent that said first primary processor and said first redundant processor agree with said second primary processor;

selecting the output signal of said second redundant processor for the command output of said second lane if said first and second comparison signals represent that said first primary processor and said first redundant processor disagree with said second primary processor, but only if said second redundant processor has not also failed; and disabling both command outputs from both said first and second lanes if both primary processors fail or if both processors of one of said first and second lanes fail.

* * * * *